US009602143B1

(12) United States Patent
Steinbrecher

(10) Patent No.: US 9,602,143 B1
(45) Date of Patent: Mar. 21, 2017

(54) SYSTEM AND METHOD FOR GENERATING WIRELESS ELECTROMAGNETIC TRANSMISSIONS MODULATED WITH SOFTWARE DEFINED COMPLEX WAVEFORMS

(71) Applicant: Donald H Steinbrecher, Brookline, MA (US)

(72) Inventor: Donald H Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/381,154

(22) Filed: Dec. 16, 2016

(51) Int. Cl.
*H04B 1/04* (2006.01)
*H04B 1/00* (2006.01)
*H04L 27/04* (2006.01)
*H04L 27/20* (2006.01)
*H04B 7/06* (2006.01)

(52) U.S. Cl.
CPC ......... *H04B 1/0035* (2013.01); *H04B 1/0475* (2013.01); *H04B 7/0669* (2013.01); *H04L 27/04* (2013.01); *H04L 27/20* (2013.01); *H04B 2001/0416* (2013.01)

(58) Field of Classification Search
CPC ..... H04B 1/0475; H04B 1/0035; H04L 27/20; H04L 27/04
USPC .......................................................... 375/297
See application file for complete search history.

(56) References Cited

U.S. PATENT DOCUMENTS

| | | | | |
|---|---|---|---|---|
| 9,182,485 | B1 * | 11/2015 | Andrews | H01Q 3/30 |
| 2006/0097940 | A1 * | 5/2006 | Shimawaki | H01Q 3/26 343/761 |
| 2016/0337017 | A1 * | 11/2016 | Moon | H04B 7/0456 |

* cited by examiner

*Primary Examiner* — Michael Neff
(74) *Attorney, Agent, or Firm* — James M. Kasischke; Michael P. Stanley

(57) ABSTRACT

An air interface array system and method for generating electromagnetic transmissions is provided. The system includes partition elements separately and operationally connected to horizontal and vertical circuit boards. In transmission, a radio frequency input is provided to each board. Each circuit board has a phase selector that generates a symbol with one of four phases relative to a plane of the partition elements such an output signal is produced. A time delay selector delays the output signal in order to focus the transmitted beam to be an input signal to an amplifier. The amplified signal drives radio frequency ports to produce horizontally and vertically polarized radiated signal vectors. The signal vectors are combined to form a radio frequency modulation symbol vector. Multiple symbol vectors form a transmitted modulation waveform.

11 Claims, 10 Drawing Sheets

The Number of Different Ways, ZY, to Form the Sets $n_i$ and $n_q$ when Synthesizing a Symbol Vector

| ZY | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 1 | 12 | 66 | 220 | 495 | 792 | 924 | 792 | 495 | 220 | 66 | 12 | 1 |
| 1 | 12 | 132 | 660 | 1,980 | 3,960 | 5,544 | 5,544 | 3,960 | 1,980 | 660 | 132 | 12 | |
| 2 | 66 | 660 | 2,970 | 7,920 | 13,860 | 16,632 | 13,860 | 7,920 | 2,970 | 660 | 66 | | |
| 3 | 220 | 1,980 | 7,920 | 18,480 | 27,720 | 27,720 | 18,480 | 7,920 | 1,980 | 220 | | | |
| 4 | 495 | 3,960 | 13,860 | 27,720 | 34,650 | 27,720 | 13,860 | 3,960 | 495 | | | | |
| 5 | 792 | 5,544 | 16,632 | 27,720 | 27,720 | 16,632 | 5,544 | 792 | | | | | |
| 6 | 924 | 5,544 | 13,860 | 18,480 | 13,860 | 5,544 | 924 | | | | | | |
| 7 | 792 | 3,960 | 7,920 | 7,920 | 3,960 | 792 | | | | | | | |
| 8 | 495 | 1,980 | 2,970 | 1,980 | 495 | | | | | | | | |
| 9 | 220 | 660 | 660 | 220 | | | | | | | | | |
| 10 | 66 | 132 | 66 | | | | | | | | | | |
| 11 | 12 | 12 | | | | | | | | | | | |
| 12 | 2 | | | | | | | | | | | | |
| | | | | | | | | | | | | | |
| Total: | Total number of Symbols | | | | | | | | | | | | |
| 91 | 13 | 12 | 11 | 10 | 9 | 8 | 7 | 6 | 5 | 4 | 3 | 2 | 1 |

FIG. 5

SYSTEM AND METHOD FOR GENERATING WIRELESS ELECTROMAGNETIC TRANSMISSIONS MODULATED WITH SOFTWARE DEFINED COMPLEX WAVEFORMS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates to a wireless electromagnetic signal waveform generating system and method of use with the system capable of digitally controlled amplitude, phase, frequency and polarization modulation in which power generation efficiency is improved for transmitting electromagnetic signals.

(2) Background of the Invention

The partitioned air interface described in U.S. Pat. No. 8,626,232 to Steinbrecher is a radio frequency continuous wave transmitter with air interface efficiencies greater than ninety percent. The assembly of the transmitter is detailed in the reference in which individual polarized radio frequency (RF) ports are each driven by an independent amplifier. The radiated power from each "Epixel" radio frequency port is combined in a far field to create a transmitted signal; the far field being an electromagnetic field at distances greater than (area)/(wavelength) units from the electromagnetic field-generating aperture air interface.

A radio frequency transmitter is more effective if the primary transmission frequency, which is called the carrier, can be amplitude modulated and/or phase modulated in order to increase a data information rate. A single carrier provides only one bit of information whereas numerous bits of information can be transmitted by modulating the carrier.

A modulated radio frequency transmitter can be even more effective if the efficiency of generating the modulated transmission is significantly higher than is presently achievable. The transmitter will be still further effective if the modulated radio frequency carrier frequency of transmission can be rapidly changed over a wide bandwidth by digital frequency selection processes.

There are numerous modulation types that comprise combinations of amplitude, phase, frequency and polarization. One type of modulation that is used extensively in communications is quadrature amplitude modulation (QAM). Quadrature amplitude modulation comprises symbol sets in which the number of symbols within the set is a power of two, such as 2, 4, 8, 16, . . . $2^N$. The number of symbols in a QAM set is called the order of the set. A radio frequency transmitter that can switch from one QAM order to another QAM order within a few clock cycles is desirable in applications wherein a communications channel is continuously changing.

In the prior art and in support of the present invention, U.S. Pat. No. 6,466,167 by Steinbrecher, discloses digital signal processing algorithms that are processed to create digital images based on energy segments captured by the partitioned air interface. A method detailed in the patent reference uses an observable signal injected into the signal paths to describe phase alignment across the partitioned air interface; otherwise, known as the Eplane.

The system is also described in which a receive mode captures radio frequency signals incident on the air interface of the antenna. An observable signal containing a low frequency component and a high frequency component is generated and inserted into the signal path associated with each partition or Epixel of an Eplane.

The observable signal passes through the same signal path as the radio frequency energy captured by the associated Epixel and can later be used to establish a phase reference at the phase center of each Epixel for the radio frequency energy captured by that Epixel. In this way, the energy captured by a plurality of Epixels can be reassembled in the digital domain as representative of the radio frequency energy incident on the Eplane.

U.S. Pat. No. 7,250,920 to Steinbrecher, teaches a method for using a partitioned air interface in applications where a radar cross-section of the air interface is a system parameter. As part of the interface system, a surface is provided with a plurality of electrically conductive partition elements. The partition elements form a plurality of comparatively small apertures that are referred to as Epixels. Each Epixel captures a portion of propagating electromagnetic waves.

Each captured time energy portion is coupled to a transmission line to form a signal path that is unique to that Epixel. In the signal process, each signal path passes through an analog-to-digital converter; thereby, forming a plurality of digital signal data streams equal in number to the number of Epixels in the partitioned interface.

U.S. Pat. No. 7,420,522 by Steinbrecher teaches a partitioned air interface and a method for determining properties of the partitioned energy capture areas. The patent reference discloses an energy efficient system for radio frequency signal acquisition that is described as a software defined air interface system. The system utilizes elements that partition the air interface, which is called an Eplane into a plurality of segments called Epixels which are used to capture portions of radio frequency signals that are incident on the air interface.

The portions of the RF signals that are captured by the Epixels are individually processed and are reassembled in the digital domain to create a digital image of the incident radio frequency signal set. When the air interface transmits electromagnetic waves, each Epixel is transmitted independently. The Epixel signals are then collectively combined in the far field to form a radio frequency beam.

SUMMARY OF THE INVENTION

It is therefore a primary object and general purpose of the present invention to provide a software-defined modulated radio frequency signal transmission capability for generating numerous waveforms.

It is a further object of the present invention to provide a software-defined modulated radio frequency signal transmission capability for generating complex modulation waveforms.

It is a still further object of the present invention to provide a radio frequency transmitter that allows rapid frequency changes within a specified bandwidth without the need to physically reconfigure the amplification and modulation capability of the transmitter.

It is a still further object of the present invention to provide a radio frequency transmitter that allows modulation waveform properties to remain unchanged when the radio frequency carrier frequency is changed within a predetermined frequency band of operation.

It is a still further object of the present invention to synthesize a modulation symbol defined by a combination of amplitude, phase, frequency and polarization.

It is a still further object of the present invention to direct a transmitted radio frequency main beam by inserting software defined time delays in each of the radio frequency signal paths that excite active radio frequency ports.

To attain the objects of the present invention, a transmission system and method of use is provided that is capable of generating modulated waveforms. When operating the transmission system, the effective aperture of each radio frequency port (Epixel) is equal to a physical area of that Epixel with the aperture defined as the physical space through which electromagnetic waves are launched into free space beyond the radiating element air interface. The effective aperture of an Eplane comprising a plurality of Epixels is therefore equal to the effective aperture of one Epixel multiplied by the number of Epixels in the Eplane. Since the equivalent gain of an Eplane aperture is proportional to the effective area of the Eplane aperture; doubling the number of driven Epixels will increase the transmitted signal gain by a factor of two.

If each Epixel RF port is driven by an amplifier delivering the same number of Watts, then doubling the number of driven Epixels will also increase the total drive power by a factor of two. Doubling the number of driven Epixels will also result in an increase in the far field effective isotropic radiated power by a factor of four with the increase based on a factor of two resulting from the increase in gain and a factor of two resulting from the increase in drive power.

The effect is that the partitioned aperture transmitter effective isotropic radiated power (EIRP) will increase by a factor of four or six decibels each time that the number of driven Epixels is doubled. Because of this relationship, the partitioned aperture emulates a digital-to-analog converter in which each Epixel acts as a Voltage least significant bit (VLSB) with the VLSB measured in Volts.

A digital-to-analog converter converts a digital word having a number of bits into a quantized analog voltage in which each input bit results in an output voltage increment referred to the VLSB. When this capability is realized, the conversion of a conventional wave transmitter into a modulated radio frequency transmitter is attainable.

In operation, each Epixel amplifier of the present invention is either "ON" (activated) or "OFF" (inactivated) with the activation status depending on the transmitter signal being generated. Each amplifier is either ON and delivering radio frequency energy to an Epixel radio frequency port or OFF and not delivering radio frequency energy to that Epixel port. The ON and OFF characteristics of each amplifier may be modified in order to reduce radio frequency energy splash into adjacent frequency bands. It is a common practice in the art to smooth a transient when radio frequency amplifiers are switched ON or OFF.

Amplifiers that have an ON and OFF capability operate with higher efficiency as compared to amplifiers that create a linear replica of an analog input signal. Since the amplifiers in the transmitter of the present invention operate in an ON and OFF mode then a significant improvement in efficiency is realized.

For the air interface, each RF port is driven by a digitally synthesized RF signal with the transmitting system able to emulate a digital-to-analog converter. The transmitting system can operate over a 10:1 frequency bandwidth so that the RF carrier frequency could be changed to any carrier frequency in the 10:1 bandwidth while the modulation of the carrier remains unchanged.

The transmitting system of the present invention is also capable of radiating radio frequency energy symbols having a predetermined amplitude, a predetermined frequency, a predetermined phase, and a predetermined polarization. The value of each predetermined property is selectable with a software-defined logical word. There is no physical change to the transmitting system upon selection of each predetermined property.

A frequency selection system that is independent of the synthesizing system will control the carrier frequency of each radio frequency port with a digitally controlled local frequency synthesizer system so that changing the carrier frequency is independent of changing the modulation symbol. All radio frequency ports may be energized at the same carrier frequency or at different carrier frequencies in order to emulate complex modulation types. Complex modulation types include orthogonal frequency division modulation in which the modulation uses multiple narrowband carriers, each of which is independently quadrature amplitude modulated.

Furthermore, the present invention uses partitioned apertures as high efficiency radio frequency transmitters with an extensive inventory of software enabled modulation waveform generation capability that includes most useful quadrature amplitude modulated symbol sets as well as numerous other modulation waveforms. Some of the modulation waveforms are new, unique, and have not been tested because a capability for generating the waveforms was not readily available.

A unique property of the software enabled approach to generating modulated radio frequency transmissions is that one modulation waveform can transition into another modulation waveform in a few clock cycles; thereby, enabling a versatile communications capability. The far field state of the radio frequency transmission system is specified by a three bit logical word. The three bit logical word would be resident in a digital register associated with the radio frequency transmission system. Writing this logical word to the digital register requires a plurality of clock cycles.

When a new digital word is present in the digital register, the state of the transmission system will change on the next clock cycle. Thus, the time required to change the modulation type is set by the amount of time to update the digital word that specifies the far field state of the transmission system.

In addition, the carrier frequency for each Epixel radio frequency port may be independently selected by a separate digital process and thereby remain stable for the duration of a transmission epoch. The carrier frequency can also be changed periodically during each transmission epoch. Time delay beam steering is accomplished by inserting a predetermined time delay in each signal path leading to a radio frequency port.

BRIEF DESCRIPTION OF THE DRAWINGS

The drawings constitute a part of this specification and include exemplary embodiments to the invention, which may be embodied in various forms. It is to be understood that in some instances various aspects of the invention may be shown as enlarged in order to facilitate an understanding of the invention.

FIG. 5 is a table indicating numerous ways that a symbol vector can be projected from the radio frequency ports illustrated in FIG. 3;

DETAILED DESCRIPTION OF THE INVENTION

Figure 1:
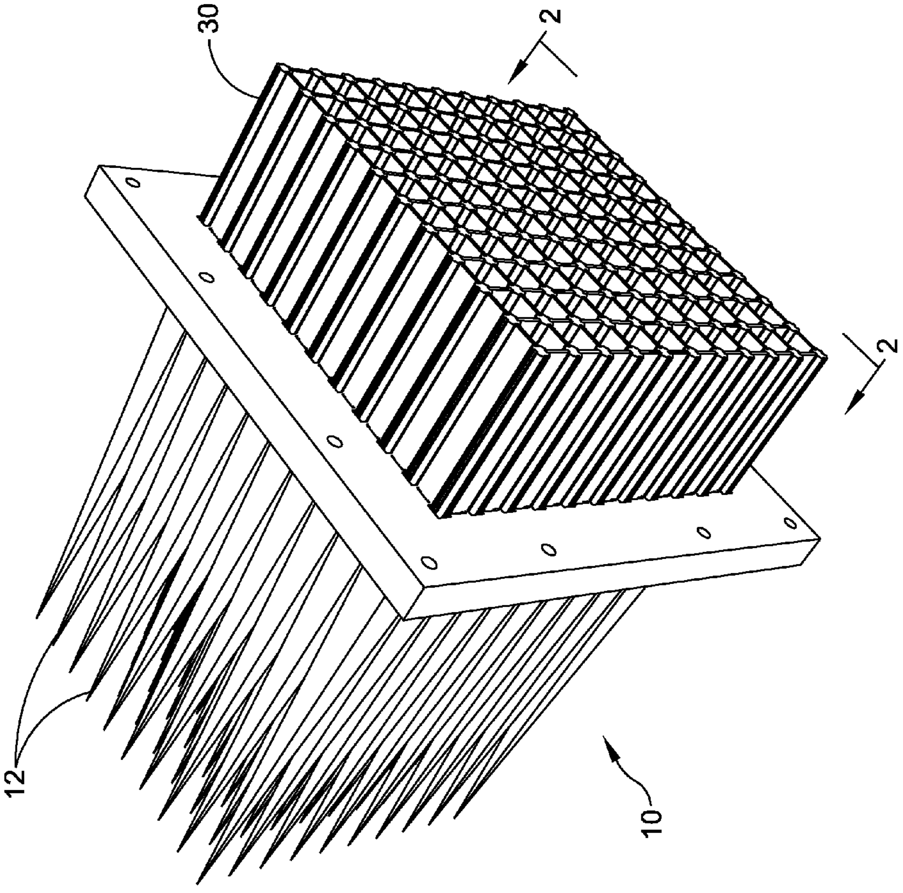
FIG. 1 (PRIOR ART)
FIG. 1 depicts a prior art White Nail partitioned air interface Eplane array.

In FIG. 1, a prior art air interface array 10 of U.S. Pat. Nos. 7,250,920 and 7,420,522 of Steinbrecher is shown with each patent incorporated by reference herein. The air interface array 10 contains a plurality of Epixel partition elements 12 connected to horizontal circuit boards and vertical circuit boards.

The use of circuit boards in transmission and receiving communication systems is known in the art; however, the configuration and operation of the circuit boards used in the system of the present application is novel. When energized, each of the circuit boards is configured to generate an electromagnetic energy signal of a particular amplitude, frequency, and phase, which drives one of the radio frequency (RF) ports and which results in a horizontally polarized or vertically polarized radiated signal vector.

The plurality of radiated Epixel signal vectors, one from each energized radio frequency signal port, are combined by vector addition in a far field of the partitioned air interface array 10 to form a radio frequency modulation symbol vector. A time series of radio frequency modulation symbol vectors form the transmitted modulation waveform.

Each horizontal circuit board is populated with electronic components to generate a radio frequency transmit signal that forms the drive waveform for one of the Epixel radio frequency ports that radiates a vertically polarized radio frequency signal vector. Each vertical circuit board is populated with electronic components to generate a radio frequency transmit signal that forms the drive waveform for one of the Epixel radio frequency ports that radiates a horizontally polarized radio frequency signal vector.

As illustrated, the partition elements 12 are configured to launch radio frequency waves—with the energy of the radio frequency waves being spatially combined to generate significantly more effective isotropic radiated power (EIRP) than is generated by a single radiating Epixel radio frequency port. Each Epixel also has a frequency-independent effective transmitting area that is approximately equal to the physical area of one Epixel. The physical area of one Epixel reflects the area of a square with sides defined by element-to-element spacing of the partition elements 12. The spacing of the partition elements 12 is scalable over a range greater than 100:1, as measured in fractions of wavelength.

The air interface array 10 contains one hundred partition elements 12, with a supporting number of circuit boards and circuit board support rails. In other configurations, the air interface array 10 may contain fewer or more partition elements 12 and may be formed in any planar shape or any convex curved-surface shape wherein the radius of curvature is large compared to the wavelength of operation. An understanding of the radio frequency port distribution for transmitter applications is attainable by referring to FIG. 2.

Figure 2:
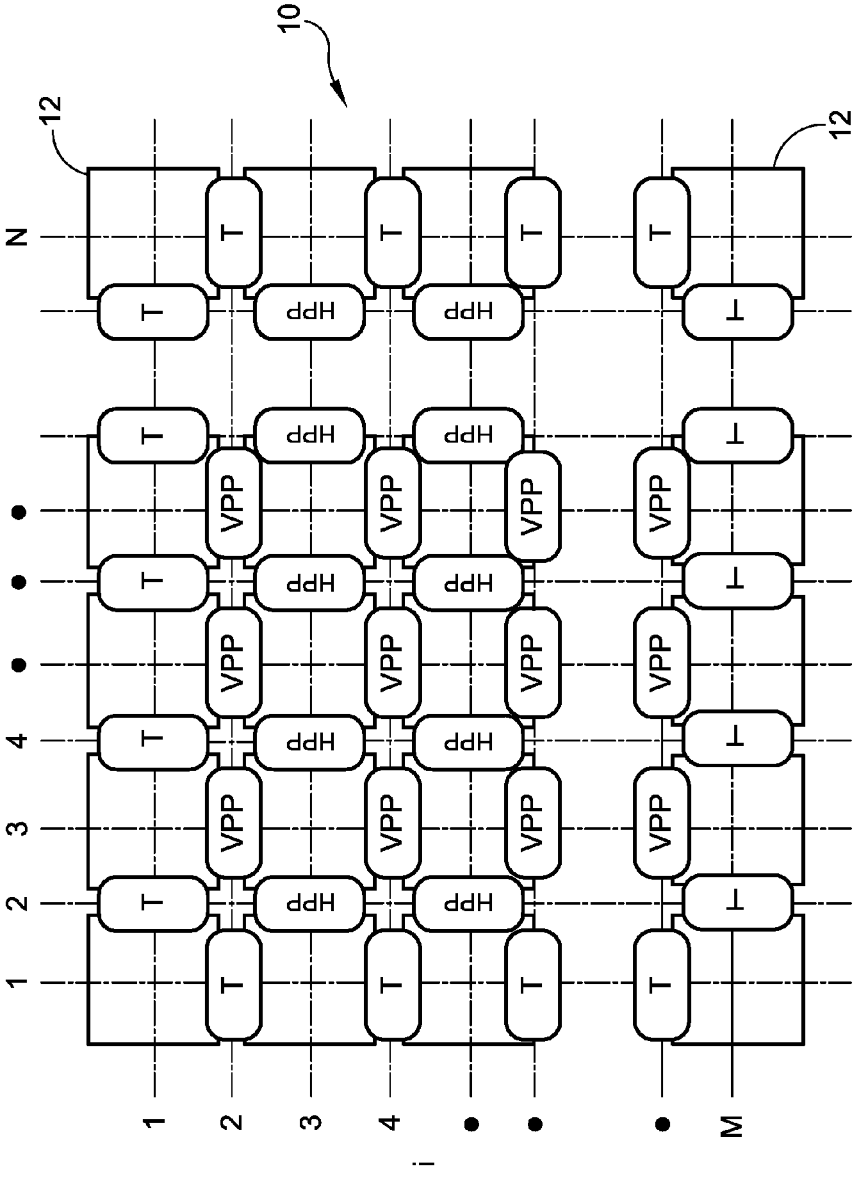
FIG. 2 (PRIOR ART)
FIG. 2 depicts the location of radio frequency ports of the Eplane array as viewed from reference lines 2-2 of FIG. 1.

FIG. 2 depicts the geometry of the electronic signal driver side of the air interface array 10 and depicts the locations of the radio frequency ports that drive the radiating elements. In this view of the rectangular air interface array 10, the partition elements 12 are arranged rows "i" and columns "j" with each row having maximum values "M" and "N" respectively. A radio frequency port is formed between each pair of the partition elements 12. The radio frequency ports on the outer boundary of the air interface array 10 are terminated ports "T" and are not used in the generation of radio frequency radiation.

The radio frequency ports located at even values of j and odd values of i radiate horizontally polarized radio frequency energy and are called Horizontally Polarized Ports (HPP). The radio frequency ports located at odd values of j and even values of i radiate vertically polarized radio frequency energy and are called Vertically Polarized Ports (VPP). The horizontal circuit boards provide the radio frequency energy for the VPP and the vertical circuit boards provide the radio frequency energy for the HPP.

The row index i has a maximum value "M", which is always an odd number while the column index j has a maximum value "N", which is also always an odd number. If the integer value $U=(M+1)/2$ and the integer value $V=(N+1)/2$ then: the number of partition elements 12 is $ZPE=UV$; the number of terminated ports is $ZT=2(U-1)+2(V-1)$; the number of VPP is $ZVPP=(U-1)(V-2)$; and the number of HPP is $ZHPP=(U-2)(V-1)$.

Figure 3:
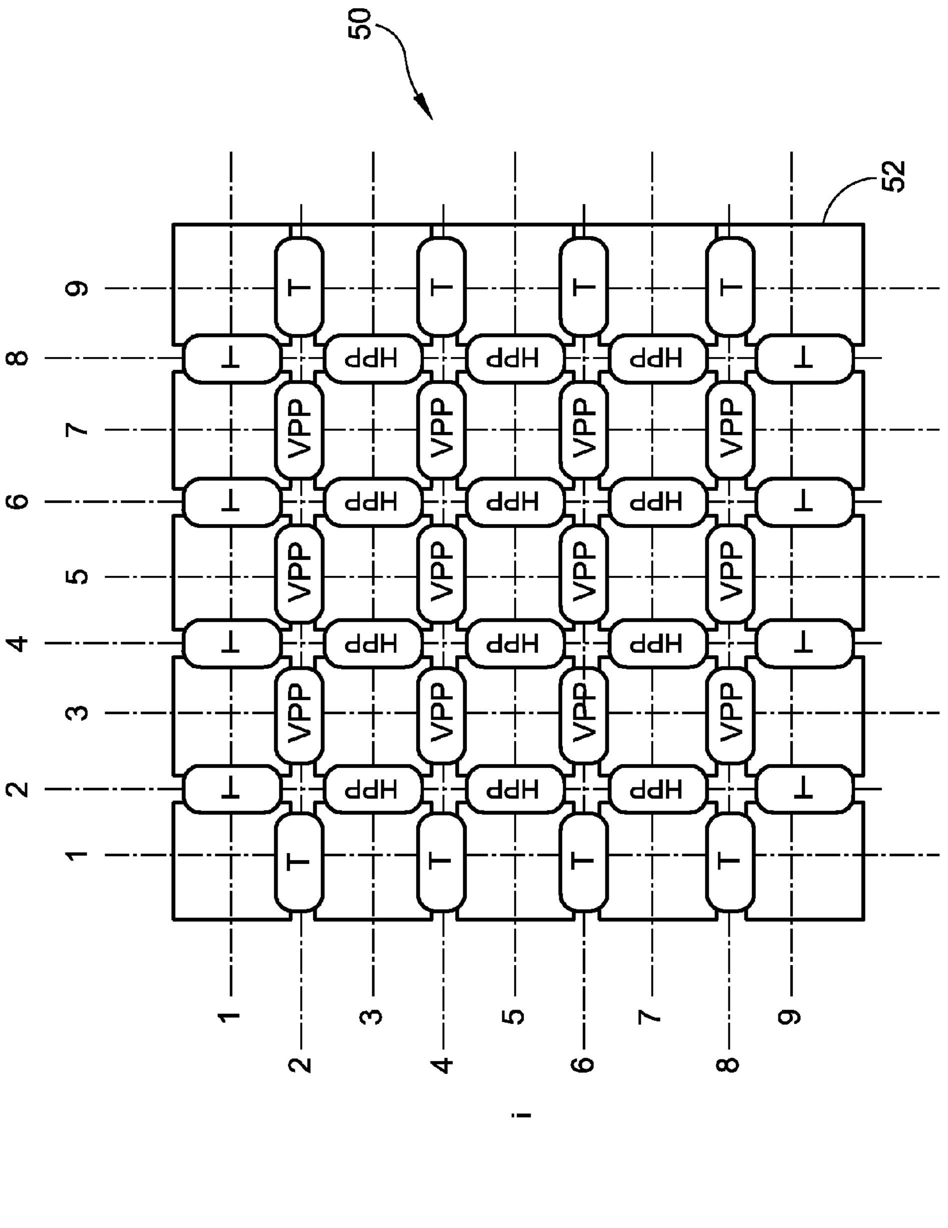
FIG. 3 is a prior art alternate view depicting the location of radio frequency ports on an Eplane array.

FIG. 3 depicts another view of the electronic signal driver side, using a rectangular air interface array 50. The air interface array 50 comprises a square array of twenty-five partition elements 52 having sixteen terminated radio frequency ports, twelve vertically polarized radio frequency ports (VPP) and twelve horizontally polarized radio frequency ports (HPP).

The figure illustrates features pertaining to modulated radio frequency transmissions formed by exciting a plurality of radio frequency ports using radio frequency signals separated in phase by a multiple of ninety degrees to excite some or all of the ports of the partition elements 52. Each RF port is driven by an RF amplifier with an output power level that is determined by the expected value of the transmitter EIRP. The determined output power level driving each radio frequency port is the same for all ports, within engineering tolerances.

Each driven radio frequency port of the partition elements 52 therefore radiates radio frequency energy into the far field to create a unit magnitude signal vector. The maximum vertically polarized EIRP occurs when all twelve VPP are driven by amplified radio frequency signals that have the same amplitude and phase. The resulting far-field vector, which defines a modulation symbol, will then have a magnitude of twelve units.

Figure 4:
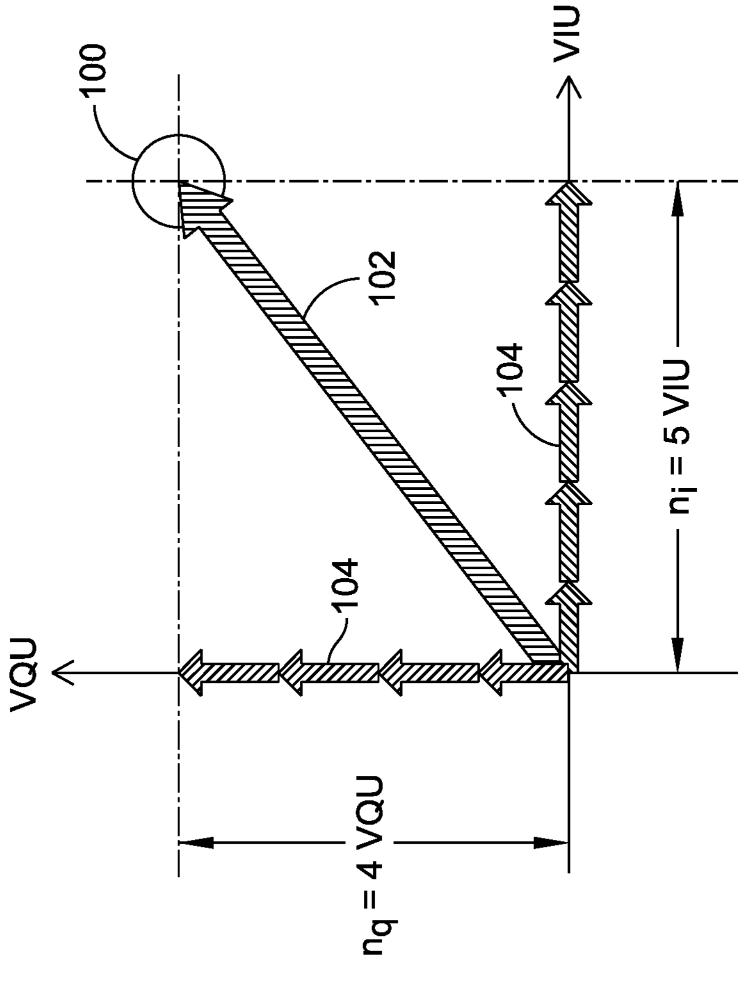
FIG. 4 is a diagram illustrating a modulation symbol vector created from a plurality of radio frequency port vectors.

A first quadrant vector space is illustrated in FIG. 4 where the vector space is associated with the creation of vertically polarized modulation symbols for the air interface array 50 illustrated in FIG. 3. A modulation symbol 100 is created by a set of unit vectors, each of which results when a radio frequency drive signal is applied to one of the twelve VPP identified in FIG. 3. The phase of the radio frequency drive signals determine the orientation of the unit vectors that add up to a symbol vector 102. The tip of the symbol vector 102 defines the modulation symbol 100.

The modulation symbol 100 is a point in vector space which is the vector sum of nine unit vectors 104, five of which are aligned with the in-phase up axis labeled VIU (vertical in phase up) and four of the unit vectors are aligned with the quadrature phase up axis VQU (vertical quadrature phase up). VIU and VQU are two of the four vector dimensions in relative phase space. The other two directions are VID and VQD in which "D" refers to the down direction in vector space. In summary, VIU is equivalent to relative phase=zero; VQU is equivalent to the relative phase=ninety degrees; VID is equivalent to the relative phase=one hundred and eighty degrees and VQD is equivalent to the relative phase=two hundred and seventy degrees.

Thus, the modulation symbol 100 is defined by the coordinates ($n_i$, $n_q$) wherein ($n_i$=5 VIU) and ($n_q$=4 VQU). A complete set of vertically polarized modulation symbols for the air interface array 10 comprises all possible values for the symbol coordinates ($n_i$, $n_q$), which for the array is seventy-eight in each quadrant or a total of three hundred and twelve for all quadrants.

Since each active VPP in FIG. 3 produces a nearly identical unit vector in the far field; the VPP to be activated in the creation of a modulation symbol may be chosen at random. The random selection may be made in the software controller each time that a signal is generated in order to average out small variations among the set of available radio frequency ports.

Referring again to FIG. 4, when a vertically polarized symbol is created, the $n_i$ VPP may be selected at random from the twelve VPP and the $n_q$ VPP may be selected at random from the remaining ($12-n_i$) VPP. Thus, the number of ways in which a given symbol can be formed may be very large. This number of ways in which a given symbol can be formed is illustrated by the table in FIG. 5.

The modulation signal 100 identified in FIG. 4 is defined by ($n_i$, $n_q$)=(5,4). The table in FIG. 5 illustrates the number of ways that the symbol can be synthesized by randomly selecting the $n_i$=5 VPP and the $n_q$=4 VPP from the twelve available VPP identified in FIG. 3. The rows and columns of the table represent the values of $n_q$ and $n_i$ respectively. Referring to the column representing $n_i$=5 and to the row $n_q$=4; the number of possible ways to select these coordinates is 27,720. Similarly, other possible symbol combinations can be identified.

The total number of symbols that are possible to synthesize in one quadrant by selecting combinations of the twelve VPP identified in FIG. 3 is ninety-one. However, the ninety-one combinations includes both the thirteen symbol groups for $n_i$=zero and the thirteen symbol groups for $n_q$=zero. Thus, the number of symbols unique to one quadrant is 91−13=78 and the total number of unique symbols in four quadrants is 4×78=312.

Figure 6:
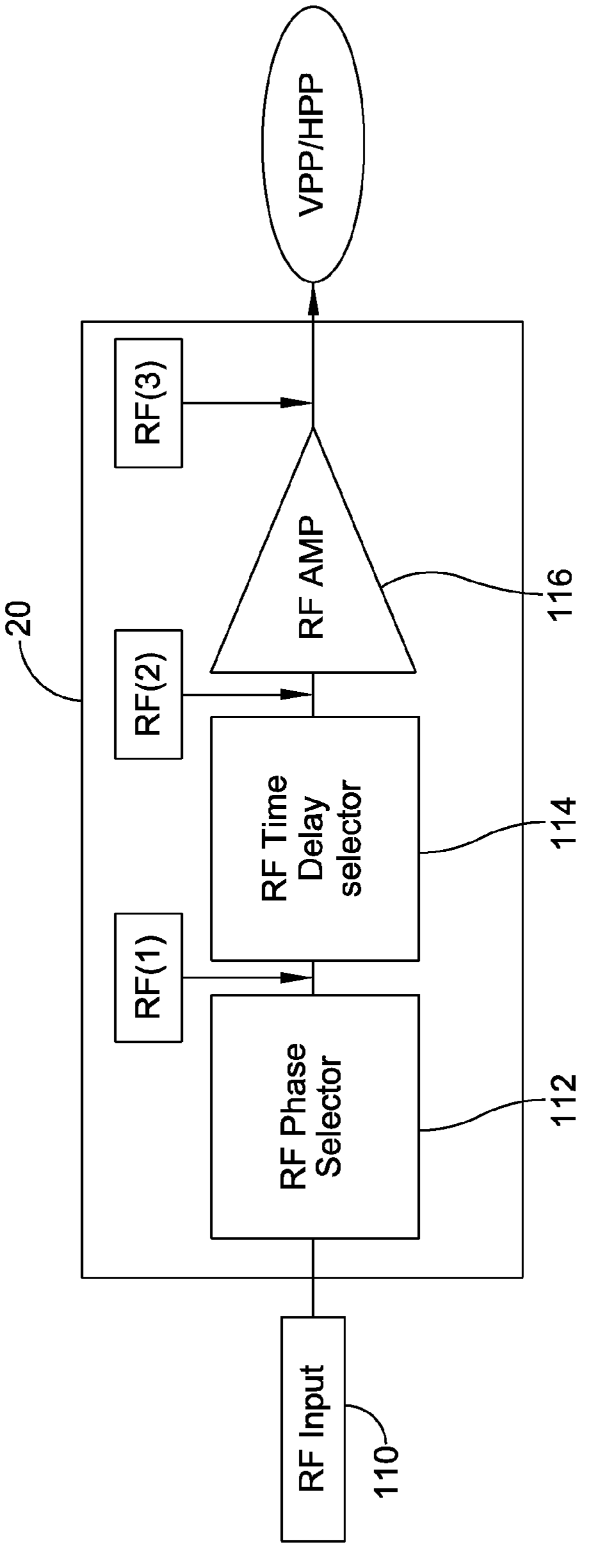
FIG. 6 is a functional block diagram of a circuit board used to condition the radio frequency signals driving each active radio frequency port in the air interface.

The principal components located on each circuit board 20 that feeds radio frequency energy to an active VPP or HPP are illustrated in FIG. 6. There is one circuit board 20 for each VPP and one circuit board for each HPP.

The principal components on each circuit board 20 logically determine the amplitude, phase, and time delay of the radio frequency symbol vector generated by the VPP or HPP fed by that specific circuit board. Each circuit board 20 is programmed by a logical word to generate a symbol with one of four phases and one of a plurality of discrete time delays. For this invention, a logical word is a string of ones and zeros that are the states of a radio frequency phase selector 112 and a radio frequency time delay selector 114.

A radio frequency input 110 is phase synchronous across all available radio frequency ports. The radio frequency phase selector 112 shifts the phase of the radio frequency input 110 by a multiple of ninety degrees such that the output labeled RF(1) has a relative phase of zero degrees, ninety degrees, one hundred and eighty degrees or two hundred and seventy degrees with respect to all other active radio frequency ports. In addition, the radio frequency phase selector 112 can switch the radio frequency power ON or OFF. One bit is required to turn the radio frequency power ON or OFF and two bits to select the phase. Thus, the logical word controlling each circuit board 20 will have three bits assigned to the control of the time delay increments with each signal path. Other bits may be reserved for special functions. A symbol clock determines the beginning and end of each symbol transmitted.

The RF input 110 is provided for each circuit board 20 in the air interface array 10. The RF input 110 may be the same for all circuit boards or multiple radio frequency inputs may be deployed strategically across the air interface array 10 in order to emulate a complex modulation. Decisions of this type are likely made in the cognitive functionality of the software controller.

The RF input 110 passes to the radio frequency phase selector 112 in which the phase of the radio frequency signal is shifted to align with one of four relative phases, 0, 90, 180, and 270 degrees to produce an output RF(1) signal. The phases of the RF(1) signals are measured relative to each other across all active VPP and HPP of the air interface array 10. For this reason, the absolute value of the phase shift labeled 0 degrees may actually be any number of degrees so long as the phases labeled 90, 180, and 270 degrees are measured relative to the phase shift labeled 0 degrees. The phase shift labeled 0 degrees should be consistent within engineering accuracy across all circuit boards when measured in the signal RF(1).

The signal RF(1) forms the input signal to the time delay selector 114. The time delay selector 114 delays the signal RF(1) by a known incremental amount that is determined for each VPP and HPP by a beam steering algorithm that computes the nearest available phase increment for every active radio frequency port in order to focus the transmitted beam in a desired direction. In some instances, it may be desirable to direct more than one beam with each beam in a unique direction and each beam having a unique modulation. The software-defined time-delay beam steering algorithm for use in the present application is defined as follows.

When transmitting a radio frequency signal, an energy beam is directed to a desired receiver. The direction of the beam to the receiver may be specified in terms of the angles that a beam from the transmitter to the receiver makes with the Eplane of the transmitter. Two angles are necessary to specify the direction of the receiver, which are often determined by a direction-of-arrival system and results in a vector direction relative to a co-located transmitter Eplane.

If the direction of a desired receiver relative to the transmitting aperture is known, then a transmitted signal Poynting vector is directed toward the receiver. This direction is accomplished by aligning the Poynting vector with a ray from the transmitting Eplane to the desired receiver. The alignment is accomplished by inserting time delays in each Epixel transmission to steer the Poynting vector of the transmission to the direction of a receiver. The necessary Epixel time delays can be calculated geometrically from the vector direction of the desired receiver relative to the transmitter Eplane. The Epixel time delays are determined by the beam-steering algorithm as follows.

The algorithm-determined distances from each Epixel RF port phase center to the desired receiver are different by incremental amounts, dR(i,j) (See FIG. 2), that depend upon the position, (i,j), of each Epixel phase center in the Eplane aperture and the two angles that define the direction of the desired receiver. The algorithm-determined time difference for the signal component from Epixel (i,j) to reach the desired receiver is different by dR (i,j) divided by the speed of light, c.

Beam steering is accomplished by adding an algorithm-determined incremental time delay to each signal component such that all signal components arrive at the desired receiver at the same time. Note that any fixed time delay can be added to the signal components without changing the direction of the beam. In order to steer a beam toward a desired receiver the signal component from Epixel (i, j) is delayed by an amount [td+dR (i,j)/c]. The result is that all signal components arrive at the desired receiver at the same time.

Alternatively, the Eplane of the transmitter may be physically re-oriented so that the boresight, which is a ray that is normal to the Eplane of the transmitter, points in the direction of the desired receiver. The objective is to create a phase plane that is normal to the direction of the desired receiver.

A time delayed signal RF(2) becomes the input signal to a circuit board amplifier 116. The finite set of incremental time delays that can be added by the time delay selector 114 is predetermined for an air interface array 10 of a given size with the set being identical for all of the circuit boards 20. A fixed baseline time delay may be added to the set of incremental time delays such that the set of time delays begins with a baseline time delay $t_0$ and successive elements in the set are determined by incrementing $t_0$ by an integer multiple of $\Delta t$ such that the $k_{th}$ time delay would be $t_k = t_0 + k\Delta t$, $0<k\leq z$, in which k=z defines the largest time delay.

The signal RF(2) forms the input to the circuit board amplifier 116. The circuit board amplifier 116 establishes the amplitude of the signal RF(3). The signal RF(3) is applied to one of the VPP in order to radiate a vertically polarized radio frequency port vector or to one of the HPP in order to radiate a horizontally polarized radio frequency port vector. Since the amplifier 116 is fed by a radio frequency signal of constant amplitude; the amplifier may be of a class that operates with high efficiency.

The output power RF(3) is unspecified since there is no theoretical constraint on output power. In a practical system design, the power constraints will be determined by other factors. It is assumed that the amplifier gain is adjusted such that the circuit board output power RF(3) is the same within engineering tolerances for all of the circuit boards in a particular air interface system.

In summary, a particular Eplane White Nail air interface system 10 will incorporate a number of circuit boards 20 equal to the number of Eplane radio frequency ports. Each circuit board 20 will have a radio frequency input signal of the same amplitude and phase and will have three basic functional signal modifier blocks. The first block (representing the phase selector 112) will establish the relative phase of the radio frequency input signal at the output, RF(1). The second block (representing the time delay selector 114) will time delay the RF(1) signal by an increment selected from a finite set of time delays in order to establish the direction of the spatially combined radio frequency signal Poynting vector relative to the bore sight vector of the Eplane. The result of time-delaying the RF(1) signal is referred to as the RF(2) signal. The third block (including the circuit board amplifier 116) will amplify the RF(2) signal to create a radio frequency port drive signal RF(3) for one of the Eplane radio frequency ports.

Figure 7:
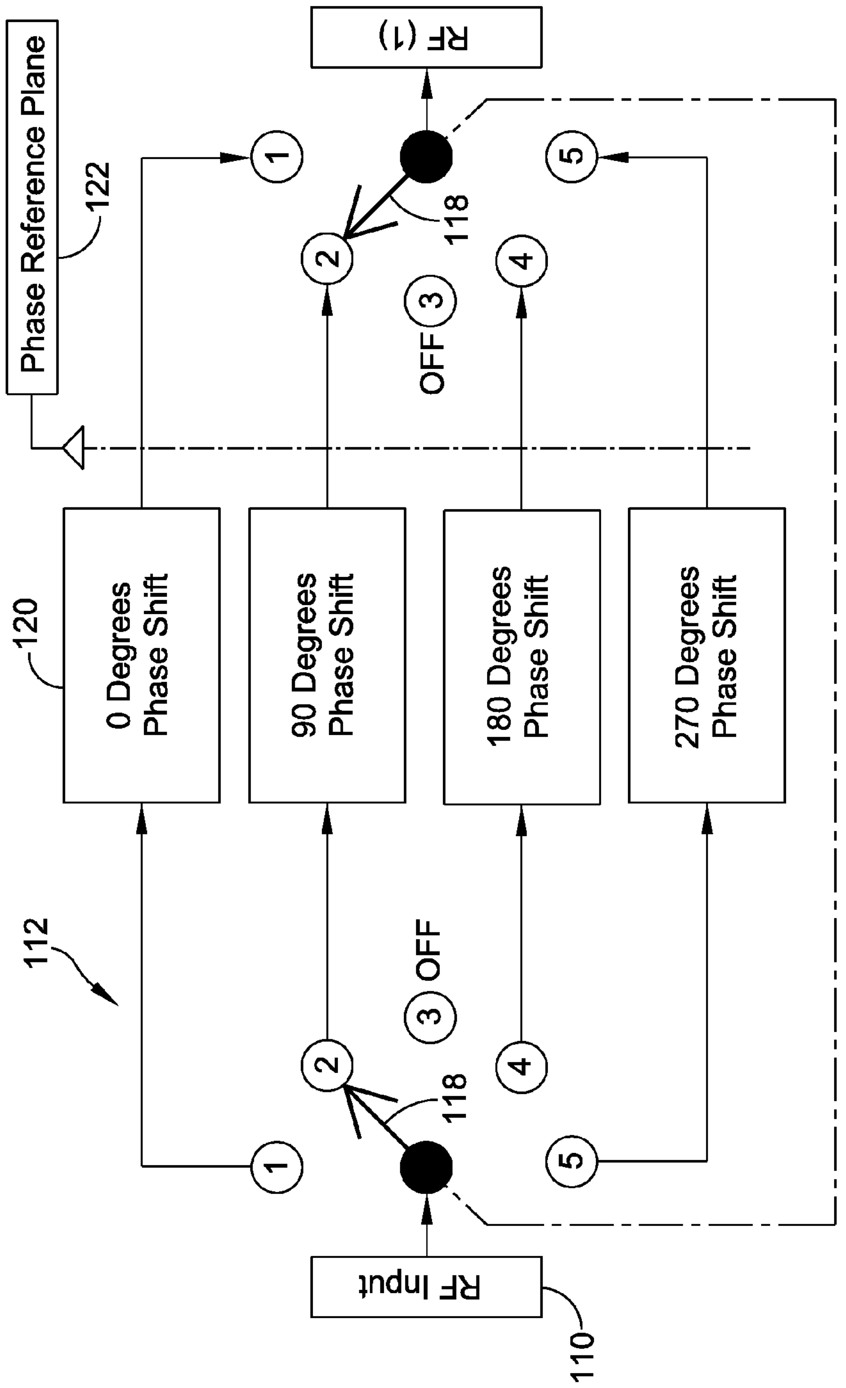
FIG. 7 is a notional block diagram of a digitally controlled phase selector function of each radio frequency circuit board.

In FIG. 7, a notional block diagram representing the radio frequency phase selector 112 is illustrated. Those skilled in the art will recognize that this functionality may be realized in numerous architectures and the chosen method will depend on the application being addressed. In the diagram, ganged selector switches 118 operate in unison to select one phase shifter 120. In this way, the relative phase output radio frequency signal RF(1) is shifted to one of four values separated by a multiple of ninety degrees. A selector switch position labeled "3" is provided to turn the radio frequency signal OFF while being able to properly terminate both the RF Input 110 and a RF(1) port by placing terminations on both selector switch positions labeled "3".

The phases of the RF(1) signals are measured relative to a phase reference plane 122 across the active VPP and HPP of the air interface array 10. For this reason, the absolute value of the phase shift 120 labeled "0" degrees may actually be any number of degrees so long as the phases labeled "90, 180, and 270" degrees are measured relative to the phase shift labeled "0" degrees. The phase shift 120 labeled 0 degrees should be consistent within engineering accuracy across the circuit boards 20 when measured in the RF(1) signal set.

The term "engineering accuracy" applies to the mean and standard deviation of the set of all phases at the system phase reference planes. The expected bounds on standard deviation will be application specific but, in general terms, a standard deviation on the order of ten percent of the mean is expected for systems using commercially available components. In this way, the phase shift 120 labeled 0 degrees establishes the phase reference plane 122 across the circuit boards pertaining to one air interface array.

The block of the phase selector 112, illustrated in FIG. 7, is notional and is not intended to represent the actual construction of the phase selector. Those skilled in the art will recognize that there are many frequency and bandwidth dependent ways to reduce to practice, the functionality of the phase selector 112. In a preferred embodiment, the phase selection process for each circuit board 20 will be enabled by a 3-bit digital word provided by software that drives the modulation process. The duration of each enabled phase shift will be controlled by a system symbol clock so that each successive symbol may have a unique 3-bit phase shift assigned to each circuit board phase selector 112. A typical 3-bit phase word is summarized in Table One.

TABLE ONE

| Three-Bit Phase Word | | |
|---|---|---|
| | zero | one |
| Bit 01 | I | Q |
| Bit 02 | DOWN | UP |
| Bit 03 | OFF | ON |

Table Two details a typical phase shift selector process based on a three-bit word that is consistent with the notional diagram in FIG. 7.

TABLE TWO

| Three-Bit Phase Word | | | | | |
|---|---|---|---|---|---|
| Bit 01 | Bit 02 | Bit 03 | RF | Switch Position | Phase Shift |
| — | — | ZERO | OFF | Three | — |
| ZERO | ONE | ONE | ON | One | 0-DEG. |
| ONE | ONE | ONE | ON | Two | 90-DEG. |
| ZERO | ZERO | ONE | ON | Four | 180-DEG. |
| ONE | ZERO | ONE | ON | Five | 270-DEG. |

Figure 8:
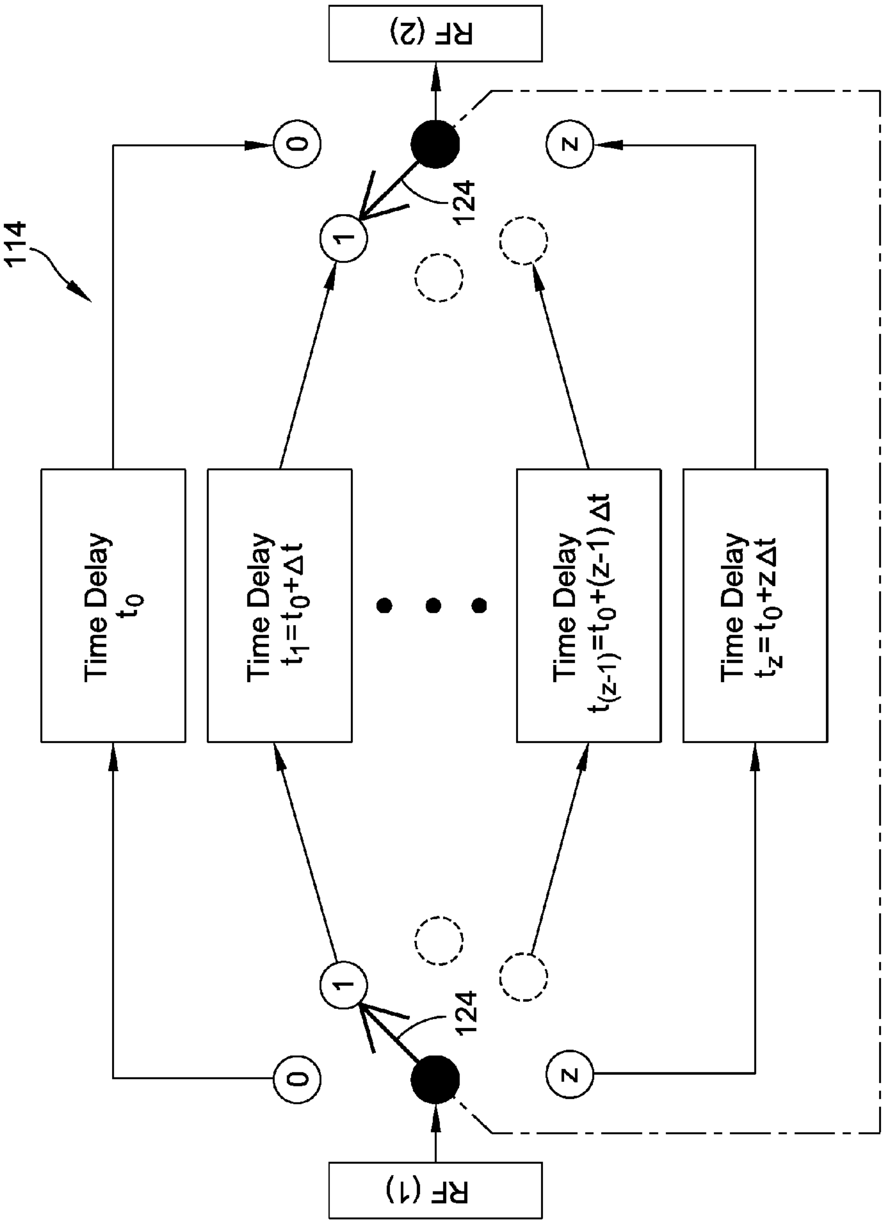
FIG. 8 is a notional block diagram of a digitally controlled time delay selector function of each radio frequency circuit board.

Referring also to FIG. 6, the RF phase selector 112 creates the RF(1) signal set, which then forms the input signal set for the function of the RF time delay selector 114 as illustrated in FIG. 8.

Many applications of the air interface array 10 as a modulated transmitter of radio frequency energy are improved by the incorporation of a digitally controlled radio frequency beam steering capability. As illustrated in FIG. 6, RF beam steering is enabled by introducing a digitally controlled time delay in each RF signal path by the RF time delay selector 114 in each circuit board RF signal path. The notional functionality of the digitally controlled RF time delay selector 114 is illustrated in FIG. 8.

In the figure, an input signal RF(1) is delayed by a time delay increment to form an output signal RF(2). The time delay increment consists of a baseline time delay $t_0$, plus a variable increment that is an integer multiple of a basic increment Δt, which results in a $k_{th}$ time delay of ($t_0$+kΔt). The index, k, has a largest value, z, and a smallest value, 1. A notional ganged selector switch 124 has (z+1) positions in order to select the baseline time delay and each of the z incremental time delays.

Referring again to FIG. 2, allow 'S' to represent the spacing between adjacent partition elements where S spacing is the distance between the centers of the elements. The distance "S" is the distance between adjacent VPP or adjacent HPP which may be expressed as S=W[(j+2)−j] where "W" is a scale factor. That is, allow S to represent the spacing between odd values of i and the spacing between odd values of j (i.e. 1-3, 3-5 etc). For the purposes herein, S is measured in centimeters. Then, the diagonal dimension, measured in centimeters, of the air interface array 10 is $$D = S\sqrt{\left(\frac{M-1}{2}\right)^2 + \left(\frac{N-1}{2}\right)^2} \text{ centimeters} \quad (1)$$

in which: D is the diagonal dimension; S is the partition element spacing; M is the maximum value of the row index i, and N is the maximum value of the column index j.

Figure 9:
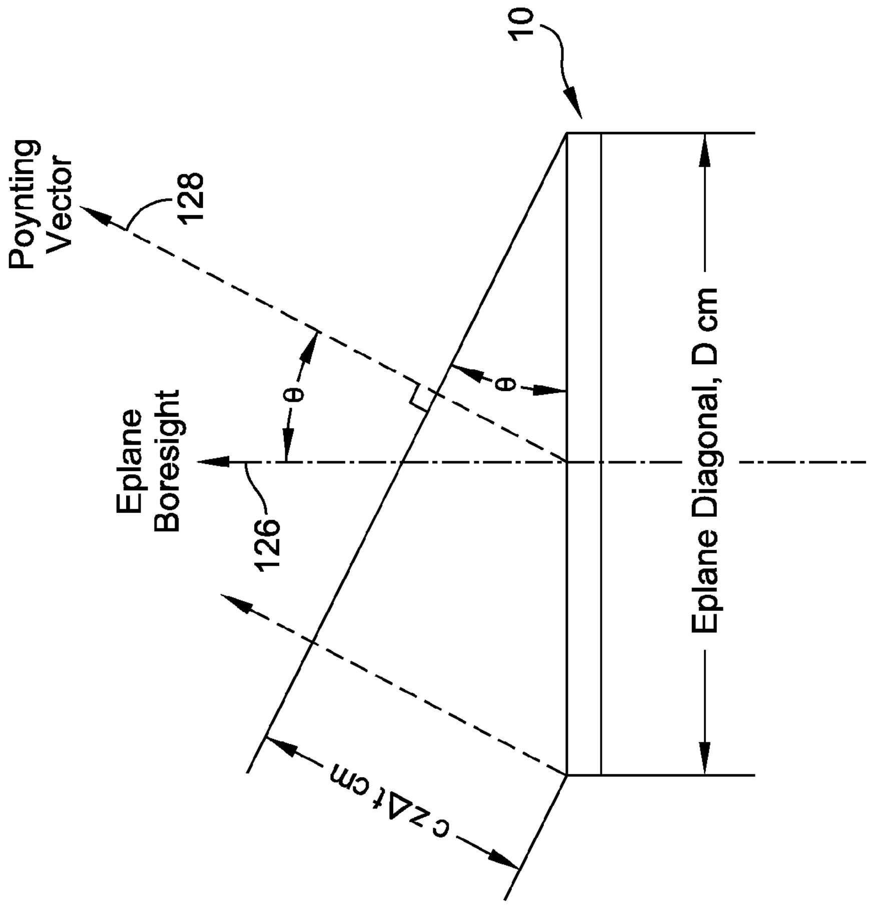
FIG. 9 depicts a diagram for computing a maximum time delay for a given maximum beam angle.

Using the diagonal dimension D; FIG. 9 illustrates a notional geometry for determining the parameters of the RF time delay selector 114. One method for realizing a time delay is to pass the signal through a length of transmission line. Those skilled in the art will recognize a plurality of ways to realize the functionality depicted in the figure. The air interface array 10 is shown in profile along a diagonal dimension, measured in centimeters, in order to place the Eplane diagonal "D" in reference to an Eplane boresight vector 126 and a transmitted RF wave Poynting vector 128; thereby, defining the maximum Poynting vector direction angle 'θ'. Then, by the geometry, it is observed that $$cz\Delta t = D \sin\theta \quad (2)$$

in which, "c" is the speed of light in centimeters/second; "z" is the time delay resolution parameter (an integer); Δt is the smallest time delay increment; "D" is the Eplane diagonal measured in centimeters and θ is the maximum direction angle defined by the Eplane boresight vector 126 and the RF transmission Poynting vector 128.

The time delay resolution parameter, z, defines the number of selectable time delays. In a preferred embodiment, z would be selected as a power of two, such as 8, 16, 32, . . . so that a 3, 4, 5 . . . bit binary word would define the selected time delay for each of the circuit boards 20 in a particular air interface array 10. Then, Δt would be calculated using Equation (2) with the specific Eplane diagonal dimension D and the maximum Poynting vector direction angle θ required by the operation of the air interface array 10. Finally, the baseline time delay, $t_0$, can be any convenient time delay. Only the differential time delays, kΔt, affect the Poynting Vector direction angle, θ.

Figure 10:
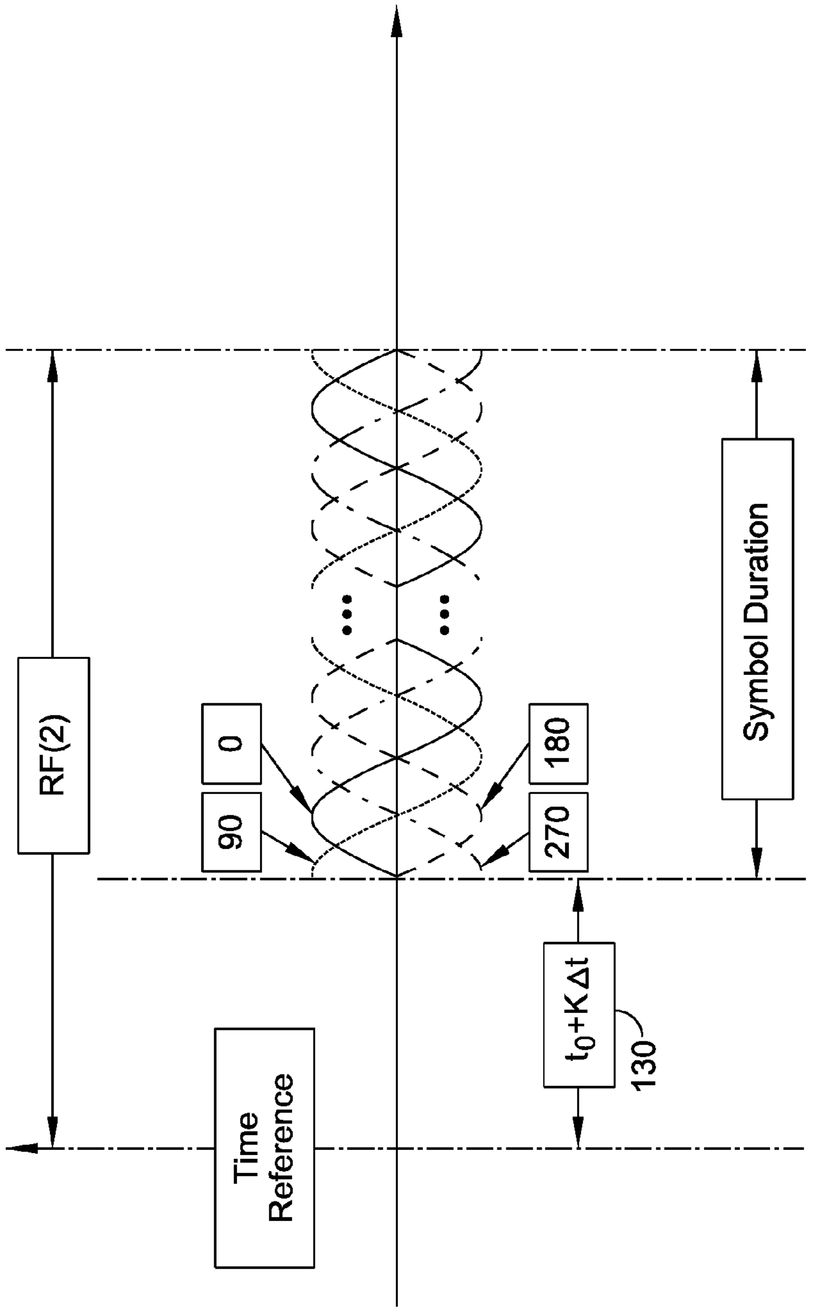
FIG. 10 is an illustration of the radio frequency symbol segments that produce a typical modulation symbol.

FIG. 10 illustrates a graphic of RF(2) at the output of the RF time delay selector 114. The radio frequency signal RF(2) is in divided into two parts. The first part is a time delay 130 while the second part is a radio frequency symbol segment in one of four phases. A time reference is identified and is the same for all of the circuit boards 20.

The circuit board time delay 130 is measured from the time reference. Each circuit board time delay 130 is selected from the set of incremental time delays in accordance with the time delay beam steering algorithm in order to direct the Poynting vector along a desired path. The time delay algorithm functions have a separate receiving system that is capable of determining the direction of arrival of signals of interest that provides the information necessary to specify the direction of the Poynting vector relative to the transmitter air-interface plane for each target to be addressed by a transmitted radio frequency signal.

Once the Poynting vector direction is known; the geometry of the transmitter Eplane provides the geometrical properties necessary to compute the relative time delay for each and every Epixel. Next, the algorithm selects the nearest time delay increment for each and every Epixel and transmits a digital word to each time delay selector that is active in the next transmission.

The time delay beam steering algorithm also assigns to each circuit board, an incremental time delay such that each radio frequency symbol segment arrives at a plane normal to the Poynting vector at approximately the same time. In this way, the radio frequency symbol segments will constructively add in the desired Poynting vector direction. The radio frequency transmissions take place on a symbol-by-symbol basis and each symbol may be transmitted along a unique Poynting vector path in order to achieve a specific mission objective.

The circuit board radio frequency symbol segment begins in one of four phases 0, 90, 180 or 270 at the end of the circuit board time delay 130. Each unique symbol duration is determined by a symbol clock. The symbol repetition rate is also determined by the symbol clock in the master digital control system that enables the radio frequency transmission system to achieve a predetermined mission objective. The symbol set RF(2) is amplified by a plurality of circuit board amplifiers 116 and fed to a plurality of Eplane radio frequency ports VPP/HPP in order to form the radio frequency port vector components of the resulting radio frequency transmission modulation symbol.

The present invention presents the circuit board amplifiers 116 as having the same gain and output power so that each radio frequency port is driven by a radio frequency symbol segment having the same amplitude. This restriction constrains the amplitude resolution of the air interface array 10 to a finite number of discrete steps. For example, referring to FIG. 3, the twelve VPP will allow a maximum power resolution of twelve discrete amplitude steps.

In some transmitter applications, a higher power resolution may be required in order to constrain out-of-band energy or to reduce inter-symbol interference. The power resolution may be increased by selecting the amplifier gain and power output from a discrete set of values consistent with the requirements of the application. For example, a 4-bit digital word could be used to select one of sixteen different amplifier power levels for each circuit board; thereby, enabling the array of FIG. 3 to generate one hundred and ninety six discrete EIRP symbol power levels, not all of which will be unique.

More specifically, the modulation space defined by a 10×10 air interface array with seventy-two active vertically polarized RF ports and seventy-two active horizontally polarized RF ports contains more than one hundred million unique symbols, each of which is the sum of four vectors whose lengths are determined by the number of active Epixel radio frequency ports energized with one of four common phases and one of two common polarizations.

For example, the common phases are 0, 90, 180, and 270 degrees and there are seventy-two (72) vertically polarized radio frequency ports and seventy-two (72) horizontally polarized radio frequency ports. Then, one complex modulation symbol using all available radio frequency ports may be synthesized as the vector sum of four independent vectors defined as follows: vector 1) 50 VPP are energized with a radio frequency at 0-degrees phase; vector 2) 72−50=22 VPP are energized with a radio frequency at 90-degrees phase; vector 3) 42 HPP are energized with a radio frequency at 270-degrees phase; and vector 4) 72−42=30 HPP are energized with a radio frequency at 180-degrees phase.

The synthesis of other modulation symbols may use fewer than all of the radio frequency ports. The numbers of vertically polarized radio frequency ports for vectors 1) and 2) may be any two integer numbers whose sum is less than or equal to seventy-two. Similarly, the numbers of horizontally polarized radio frequency ports in vectors 3) and 4) may be any two integer numbers whose sum is less than or equal to seventy-two.

One embodiment of the present invention is an air interface 10 having a 10×10 array of partition elements; thereby, providing an Eplane with one hundred and eighty radio frequency ports. Thirty-six of the RF ports are terminated in resistive loads to form a boundary around seventy-two active vertically polarized radio frequency ports and seventy-two active horizontally polarized radio frequency ports. There are one hundred and forty-four active radio frequency ports that can each be energized in one of four relative phases or remain OFF (de-energized) in order to form a single modulation symbol. A minimum of three bits are required to specify each radio frequency port assignment. For example, a 432-bit digital word, (3×2×72) may be used to completely specify each possible modulation symbol.

A vertically polarized modulation symbol is generated by energizing a subset of the seventy-two radio frequency ports designated VPP. For example, all of the seventy-two ports may be energized with one of the four phases (0, 180, 90, and 270 degrees). If the symbol phases alternate between 0 and 180 degrees; the modulation is defined as 'bi-phase' with information embedded in the symbol phase.

When energized, the VPP generates a vertically polarized radio frequency transmitted signal and the HPP generates a horizontally polarized radio frequency transmitted signal. The radio frequency signals applied to the set of ON RF ports are selected from one of four relative phases designated 'IUP, IDOWN, QUP, and QDOWN'. The symbols "I" and "Q" relate to "in-phase" and "quadrature-phase" in the usual sense. These relative phases correspond as follows: IUP=0, IDOWN=180, QUP=90, and QDOWN=270 degrees relative to a common reference. The phases are only meaningful when the common reference is known or when the information is embedded in the phase difference between successive symbols in a transmission.

If thirty-six VPP are energized with zero degrees and thirty-six VPP are energized with ninety degrees; then the resulting transmitted symbol lies at a phase angle of forty-five degrees with a transmitted radio frequency amplitude equivalent to approximately fifty-one Epixels energized. By extension, seventy-two VPP will enable 2,628 first quadrant symbols when the phases QUP=90 degrees and IUP=0 degrees are used and a total of 10,512 possible symbols when all four relative phases are used. Similarly, 10,512 possible horizontally polarized symbols can be enabled with the seventy-two HPP. A complex symbol comprising one vertically polarized symbol transmitted with one horizontally polarized symbol will result in a symbol set with 10,512×10,512=110,502,144 complex symbols.

Yet another property in the use of the software enabled partitioned aperture is the greater than 10:1 instantaneous frequency bandwidth of the aperture. In practice, the actual available instantaneous frequency of operation may be limited by the choice of amplifiers or other radio frequency components in the signal path but it is notable that the bandwidth of operation could plausibly extend over a 10:1 instantaneous bandwidth if all other components in the radio frequency signal path can support the same instantaneous bandwidth as the partitioned aperture. Since the partitioned aperture is scalable, similar results can be expected over other 10:1 frequency bands using a scaled aperture.

Those skilled in the art will recognize that a partitioned aperture transmitter can also be used to generate other types of modulated waveforms such as frequency modulation (FM) or orthogonal frequency division modulation (OFDM). However, the application of the present invention focuses on the waveforms defined by a combination of amplitude, frequency, phase, and polarization while it is understood that other modulation types may also be generated by attainable variations and extensions of the disclosed method.

The foregoing description of the preferred embodiments of the invention has been presented for purposes of illustration and description only. It is not intended to be exhaustive or to limit the invention to the precise form disclosed; and obviously many modifications and variations are possible in light of the above teaching.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A transmitting system comprising:

an array of partition elements, each of said partition elements having conductive material, a portion of each of said partition elements being conical for radio frequency use with said array having at least one horizontal radio frequency port for generating vertically polarized radio frequency transmissions and at least one vertical radio frequency port for generating horizontally polarized radio frequency transmissions wherein said partition elements are located at intersections of a grid;

at least one digitally synthesized radio frequency carrier source;

at least two radio frequency circuit board operationally connected to said at least one radio frequency carrier source with each of said at least two circuit boards also operationally connected to each of said partition elements, said circuit boards integrating at least one phase referenced radio frequency input carrier frequency from said carrier frequency source with said circuit board having a radio frequency carrier phase selector with at least four selectable radio frequency carrier phases, a radio frequency carrier time delay selector, and a radio frequency amplifier; and a digital controller for controlling carrier frequency from said carrier frequency source, for controlling said carrier phase selector, for controlling said carrier time delay selector, and for controlling gain and output power of said amplifier;

wherein a circuit board output radio frequency carrier signal is oriented to drive said at least one vertically polarized radio frequency port or said at least one horizontally polarized radio frequency port.

2. The system of claim 1 wherein said at least one vertically polarized radio frequency port and said at least one horizontally polarized radio frequency ports is each associated with a radiating effective aperture of a same physical size.

3. The system of claim 2 wherein a total effective radiating aperture is equal to an effective radiating aperture multiplied by the number of polarized radio frequency ports being driven by the radio frequency carrier signal and wherein a total effective antenna gain of the radiating aperture is proportional to an area of the effective radiating aperture, such that doubling a number of driven radio frequency ports doubles an antenna gain of said air interface and doubles an effective drive power for the carrier signal.

4. The system of claim 3 wherein each said radio frequency port driven by the radio frequency carrier signal results in a far field radio frequency signal vector of a unit magnitude determined by an amplitude of the radio frequency carrier and wherein an orientation relative to other unit magnitude vectors is determined by a relative radio frequency carrier phase.

5. A method for transmitting a radio frequency modulation waveform, said method comprising the steps of:

providing at least one horizontal circuit board;

providing at least one vertical circuit board;

providing an array of partition elements operationally connected to the circuit boards, said array having at least one horizontal radio frequency port and at least one vertical radio frequency port wherein the array of partition elements form an Eplane;

energizing the circuit boards;

generating an electromagnetic energy signal subsequent to said energizing step, with the software controller and the circuit boards of a particular frequency, amplitude, and phase at the least one horizontal radio frequency port and at least one vertical radio frequency port with a result of at least one horizontally polarized signal vector at the least one vertical radio frequency port and at least one vertically polarized radiated signal vector at the least one horizontal radio frequency port;

combining the signal vectors to form at least one radio frequency modulation symbol vector; and forming a transmitted modulation waveform from a time series of the at least one radio frequency modulation symbol vector.

6. The method in accordance with claim 5 wherein said generating step further comprises the step of amplifying each radio frequency port with an amplifier having an output power level that is determined by an expected value of a transmitter effective isotropic radiated power.

7. The method in accordance with claim 5 wherein said generating step further comprises establishing an amplitude and time delay of the at least one symbol vector by a logical word of the software controller transmitted to the circuit board.

8. The method in accordance with claim 7 wherein the time delay of the at least one symbol vector is based on an increment selected from a finite set of time delays in order to establish the direction of a spatially combined radio frequency signal Poynting vector relative to a bore sight vector of the Eplane.

9. The method in accordance with claim 8 wherein said generating step further comprises operating a plurality of ganged selector switches of a phase selector in unison to select a multiple phase of ninety degree increments.

10. The method in accordance with claim 9 wherein said generating step further comprises establishing the multiple phase of ninety degree increments by the logical word of the software controller transmitted to the circuit board.

11. The method in accordance with claim 10 wherein a duration of each phase is controlled by a system symbol clock and a radio frequency time delay selector in each circuit board.

* * * * *